US008061760B2

(12) United States Patent
Reck

(10) Patent No.: US 8,061,760 B2
(45) Date of Patent: Nov. 22, 2011

(54) FOLDING TOP FOR A PASSENGER VEHICLE

(75) Inventor: Philip Reck, Leonberg (DE)

(73) Assignee: Magna Car Top Systems GmbH, Bietigheim-Bissingen (DE)

(*) Notice: Subject to any disclaimer, the term of this patent is extended or adjusted under 35 U.S.C. 154(b) by 102 days.

(21) Appl. No.: 12/723,732

(22) Filed: Mar. 15, 2010

(65) Prior Publication Data
US 2010/0230996 A1 Sep. 16, 2010

(30) Foreign Application Priority Data

Mar. 14, 2009 (DE) .......................... 10 2009 013 279

(51) Int. Cl.
*B60J 7/00* (2006.01)

(52) U.S. Cl. .................................. 296/107.09

(58) Field of Classification Search ............ 296/107.09, 296/107.01, 107.06, 107.11, 107.12, 107.16, 296/116, 118, 122
See application file for complete search history.

(56) References Cited

U.S. PATENT DOCUMENTS

| 2,463,646 | A | * | 3/1949 | Schassberger | 296/104 |
| 2,580,486 | A | * | 1/1952 | Vigmostad | 296/117 |
| 2,833,593 | A | * | 5/1958 | Olivier et al. | 296/107.1 |
| 3,035,281 | A | * | 5/1962 | Pearson | 114/361 |
| 3,167,349 | A | * | 1/1965 | Young et al. | 296/100.1 |
| 4,664,436 | A | * | 5/1987 | Eyb | 296/121 |
| 5,775,767 | A | * | 7/1998 | Harrison et al. | 296/107.09 |
| 5,903,119 | A | * | 5/1999 | Laurain et al. | 318/265 |
| 6,578,898 | B2 | * | 6/2003 | Rothe et al. | 296/107.07 |
| 6,866,322 | B2 | * | 3/2005 | Willard | 296/107.01 |
| 7,118,161 | B2 | * | 10/2006 | Neubrand | 296/107.15 |
| 7,334,831 | B2 | * | 2/2008 | Wezyk et al. | 296/107.09 |
| 7,581,776 | B2 | * | 9/2009 | Quindt | 296/107.12 |

FOREIGN PATENT DOCUMENTS

DE 10113100 A1 9/2002

* cited by examiner

*Primary Examiner* — Kiran B. Patel
(74) *Attorney, Agent, or Firm* — Brooks Kushman P.C.

(57) ABSTRACT

A folding top for a vehicle includes a cover, a frame assembly having rear and front top bows, a light, and a securing device. The cover has a top cloth and an interior covering which are spaced apart from one another. The bows extend through the spacing between the top cloth and the covering. The top cloth and the covering are stretched over the bows with the opening of the covering being rearward of the rear bow. The bows are movable between a closed position in which the cover is raised and an opened position in which the cover is lowered. The light is positioned within the opening of the covering. The securing device extends through the spacing between the top cloth and the covering between the front bow and rearward of the rear bow. The securing device tensions the light against the rear bow when the cover is raised.

15 Claims, 4 Drawing Sheets

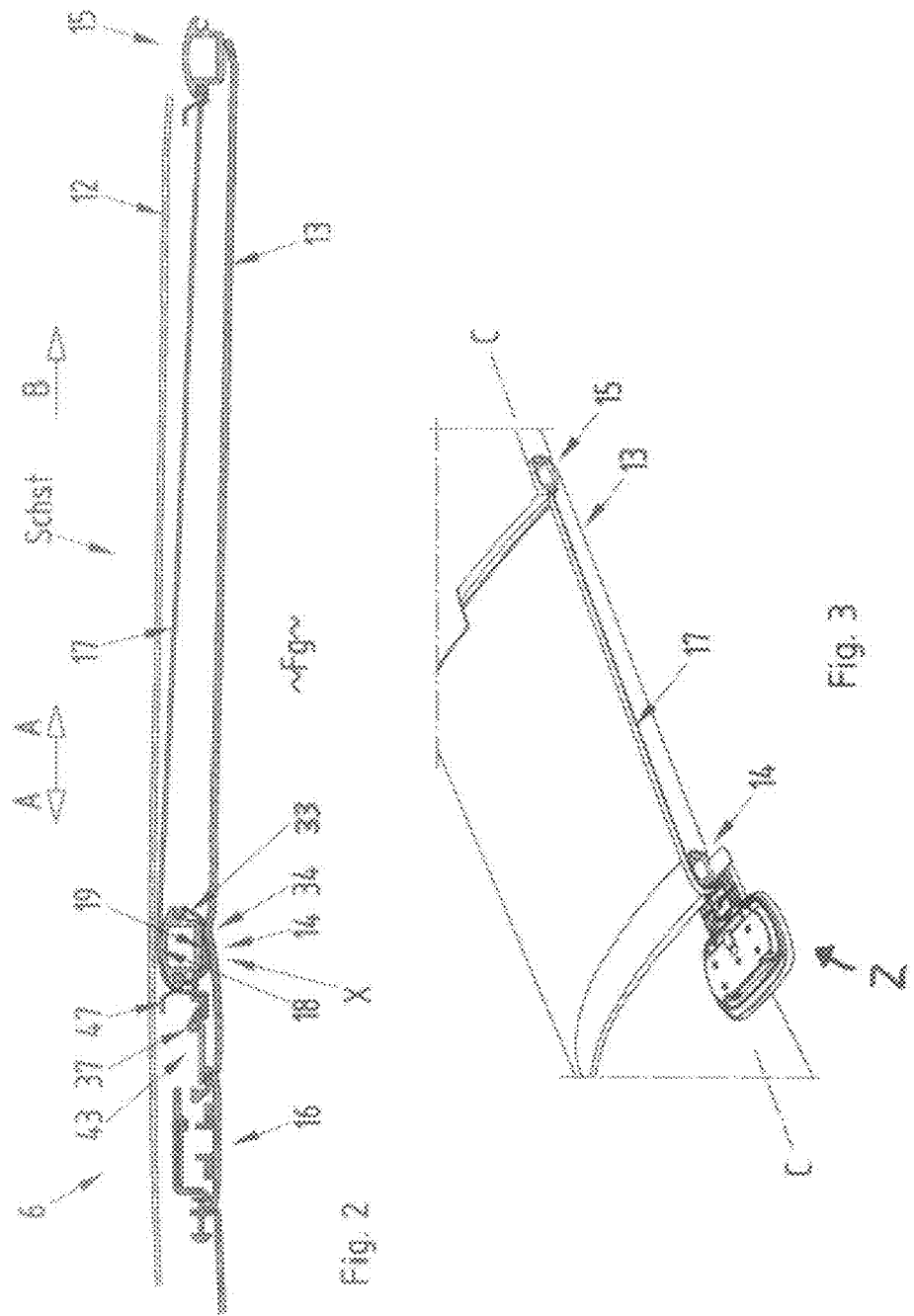

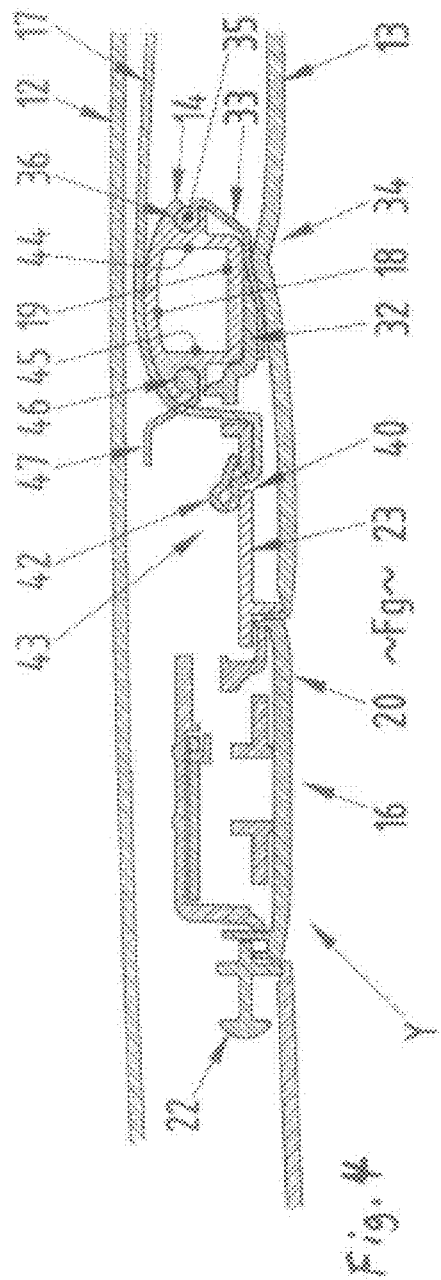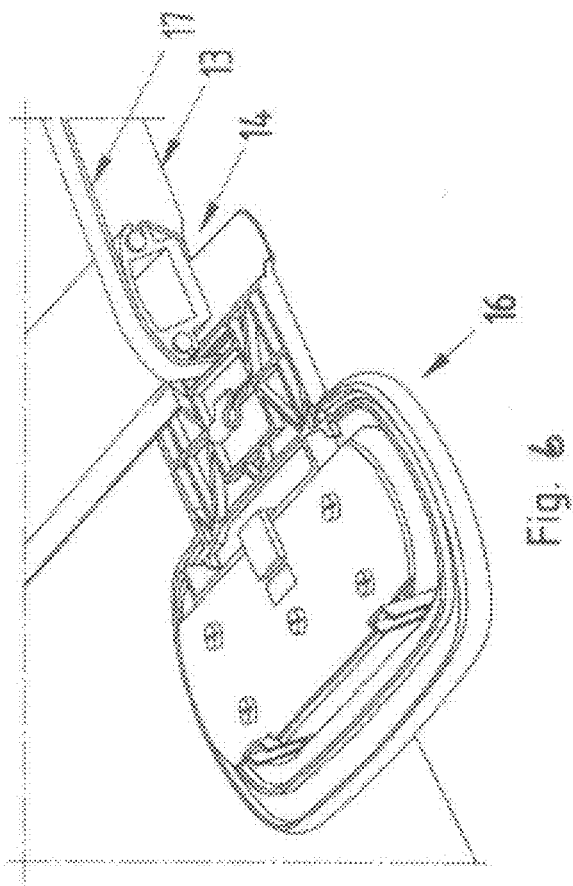

FOLDING TOP FOR A PASSENGER VEHICLE

CROSS-REFERENCE TO RELATED APPLICATIONS

This application claims foreign priority benefits under 35 U.S.C. §119(a)-(d) to DE 10 2009 013 279.1, filed Mar. 14, 2009, which is hereby incorporated by reference in its entirety.

BACKGROUND OF THE INVENTION

1. Field of the Invention

The present invention relates to a folding top for a vehicle.

2. Background Art

A known folding top is borne by front and rear convertible top bows. The top bows are movably supported on a vehicle and extend transverse to the longitudinal direction of the vehicle. A housing having an interior light is mounted on a side of the front top bow facing the passenger compartment of the vehicle.

DE 101 13 100 A1 describes a folding top having a flexible covering and a convertible top bow. The top bow holds the covering taut when the folding top is closed over a vehicle. The top bow has a rigid profile partly enclosing a hollow space. An opening in a boundary wall of the hollow space runs in the longitudinal direction of the top bow. An interior light is inserted into the opening to illuminate the passenger compartment of the vehicle.

SUMMARY OF THE INVENTION

An object of the present invention is a folding top for a vehicle in which the folding top has an interior covering with an interior light for illuminating the passenger compartment of the vehicle in which the interior light is installed in such a manner that the interior light is functional and precisely follows movement of the folding top as the folding top moves between closed and opened positions.

In carrying out the above object and other objects, the present invention provides a folding top for a vehicle. The folding top includes a cover, a frame assembly, an interior light, and a securing device. The cover has a convertible top cloth and an interior covering. The interior covering has an opening. The top cloth and the interior covering are spaced apart from one another and each extend in a longitudinal direction. The frame assembly has rear and front convertible top bows which are spaced apart from one another in the longitudinal direction. The top bows extend in a direction transverse to the longitudinal direction through the spacing between the top cloth and the interior covering. The top cloth and the interior covering are stretched over the top bows with the opening of the interior covering being rearward of the rear top bow. The top bows are movable between a closed position in which the cover is raised and an opened position in which the cover is lowered. The light is positioned within the opening of the interior covering. The securing device extends along the longitudinal direction through the spacing between the top cloth and the interior covering between the front top bow and rearward of the rear top bow. The securing device tensions the light against the rear top bow when the cover is raised.

In embodiments of the present invention, a folding top for a vehicle includes a cover having a convertible top cloth and an interior covering (i.e., interior ceiling), a convertible top frame assembly having rear and front convertible top bows, and a securing device. The folding top is movable relative to the vehicle between closed and opened positions. In the closed position, the folding top extends over and covers a passenger compartment of the vehicle. In the opened position, the folding top is rearwardly lowered into a storage compartment such as a trunk or the like of the vehicle. An interior light is integrated into the interior covering for illuminating the passenger compartment of the vehicle when the folding top is in the closed position. The interior light is integrated into the interior covering in a manner that provides degrees of freedom in the design that affect accommodation in the passenger compartment and production engineering processes. The interior light (or a lens frame thereof) interacts with the top bows in a novel manner which ensures proper function while providing a relatively large amount of strength. The lens frame is a component that can be manufactured with low cost and it is distinguished by easy incorporation in the interior covering and exemplary support on the rear top bow. The securing device is a favorably shaped elastic band that cooperates in a specific way with the top bows for securing the interior light when the folding top is in the closed position. To this end, the securing device has a novel configuration which ensures that the interior light assumes a fixed position when the folding top is in the closed position and that the interior light precisely follows the interior covering when the folding top moves from the closed position to the opened position. The latter function of the folding top following the interior covering is enabled as the securing device uncouples from the interior light as the folding top moves from the closed position to the opened position.

The above features, and other features and advantages of the present invention are readily apparent from the following detailed descriptions thereof when taken in connection with the accompanying drawings.

BRIEF DESCRIPTION OF THE DRAWINGS

FIG. 2 illustrates an enlarged view of a cross-section of the folding top along the line II-II in FIG. 1;

FIG. 3 illustrates an oblique view of a section of the folding top along one side of a longitudinal center plane of the vehicle;

FIG. 4 illustrates an enlarged view of the cross-section of the folding top corresponding to detail X in FIG. 2;

FIG. 6 illustrates an enlarged view of a section of the folding top corresponding to detail Z of FIG. 3.

DETAILED DESCRIPTION OF THE PREFERRED EMBODIMENT(S)

Figure 1:
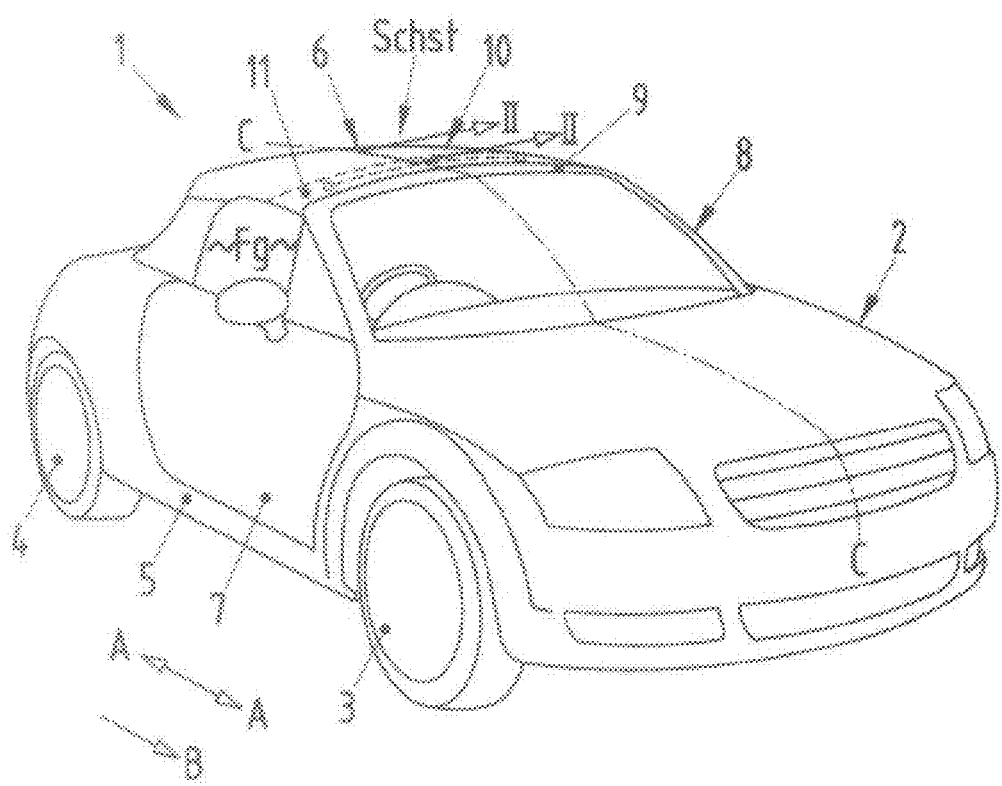
FIG. 1 illustrates a perspective view of a vehicle having a folding top in accordance with an embodiment of the present invention in which the folding top is in its closed position.

Referring now to FIG. 1, a perspective view of a passenger vehicle 1 having a folding (i.e., convertible, collapsible, etc.) top 6 in accordance with an embodiment of the present invention is shown. Vehicle 1 further includes a vehicle body 2 having a vehicle frame 5 that is supported by two sets of wheels 3 and 4. Vehicle body 2 includes side doors 7 which are mounted to vehicle frame 5. Vehicle frame 5 includes a windshield frame 8. Windshield frame 8 has an upper cross-member 9. Upper cross-member 9 extends transversely to vehicle longitudinal direction A-A between the longitudinal sides of vehicle body 2.

Folding top 6 is a vehicle roof that is movable between a closed position Schst and an opened position relative to vehicle body 2. In the closed position (shown in FIG. 1), folding top 6 extends over and covers a passenger compartment Fg of vehicle body 2. In the opened position, folding top 6 is rearwardly lowered into the trunk or the like of vehicle body 2 and stored therein.

Folding top 6 includes a folding top header (i.e., a front roof bow, a roof cap, etc.) 11 in a front region 10 of folding top 6. Folding top header 11 extends transversely to vehicle longitudinal direction A-A between the longitudinal sides of vehicle body 2. Folding top header 11 borders cross-member 9 of windshield frame 8 when folding top 6 is in the closed position. In this position, folding top header 11 connects with cross-member 9 of windshield frame 8.

Referring now to the remaining FIGS., with continual reference to FIG. 1, folding top 6 will be described in greater detail. Folding top 6 includes a convertible top frame assembly. The frame assembly is pivotably attached to vehicle body 2 in a rear area of folding top 6 to move folding top 6 between the closed and opened positions. The frame assembly includes first and second convertible top bows 14 and 15. Top bows 14 and 15 extend between longitudinal sides of vehicle body 2 and run transverse to vehicle longitudinal direction A-A at a distance from one another in the longitudinal vehicle direction A-A. As viewed in the direction of forward vehicle travel B, first top bow 14 lies behind second top bow 15. As such, first top bow 14 is a rear top bow and second top bow 15 is a front top bow. A first end of each top bow 14 and 15 is connected to corresponding side portions of the frame assembly and a second end of each top bow 14 and 15 is connected to corresponding opposite side portions of the frame assembly. Accordingly, top bows 14 and 15 move as folding top 6 moves between the closed and opened positions.

Folding top 6 further includes a cover having a convertible top cloth 12 and an interior covering (i.e., an interior ceiling) 13. Both of top cloth 12 and interior covering 13 are of a flexible material. The cover is stretched over top bows 14 and 15 with top cloth 12 being on an exterior side of the frame assembly and interior covering 13 being on an interior side of the frame assembly. The top side of top cloth 12 faces the exterior environment of vehicle 1 when folding top 6 is in the closed position. The bottom side of interior covering 13 faces passenger compartment Fg of vehicle 1 when folding top 6 is in the closed position. Top cloth 12 and interior covering 13 are spaced apart from one another with rear top bow 14 extending between facing rear portions of top cloth 12 and interior covering 13 and front top bow 15 extending between facing front portions of top cloth 12 and interior covering 13.

Folding top 6 further includes an interior light 16. Interior light 16 is for illuminating passenger compartment Fg when folding top 6 is in the closed position. Interior light 16 is integrated into an opening 26 of interior covering 13 rearward of rear top bow 14 and along vehicle longitudinal center plane C-C. As such, interior light 16 is positioned above the passenger seats rearward of the front passenger seats in order to illuminate passenger compartment Fg when folding top 6 is in the closed position.

Interior light 16 includes a lens 20. A lens frame 22 surrounds lens 20 along edge 21 of lens 20. Lens frame 22 is made of a suitable material such as plastic. Lens frame 22 has an extension on a side facing rear top bow 14. The extension is in the form of a horizontal support arm 23. Support arm 23 is made as a single piece with lens frame 22. Support arm 23 interacts in a form-fit and non-positive manner with rear top bow 14.

Rear top bow 14 has a hollow body construction including a top side 18, a bottom side 19, a first upright wall 44, and a second upright wall 45. The hollow body construction consists of a light metal, for example, and is produced using an extrusion process. Front top bow 15 may be similarly constructed. Support arm 23 is brought up against rear top bow 14 between top side 18 and bottom side 19 of rear top bow 14 (see FIG. 4).

Lens frame 22 includes an angular edge section 24 and lens 20 includes an angular edge section 25. Angular edge sections 24 and 25 face one another and have an angular edge section 27 which borders opening 26 of interior covering 13 fixed between them by clamping, gluing, etc.

Figure 5:
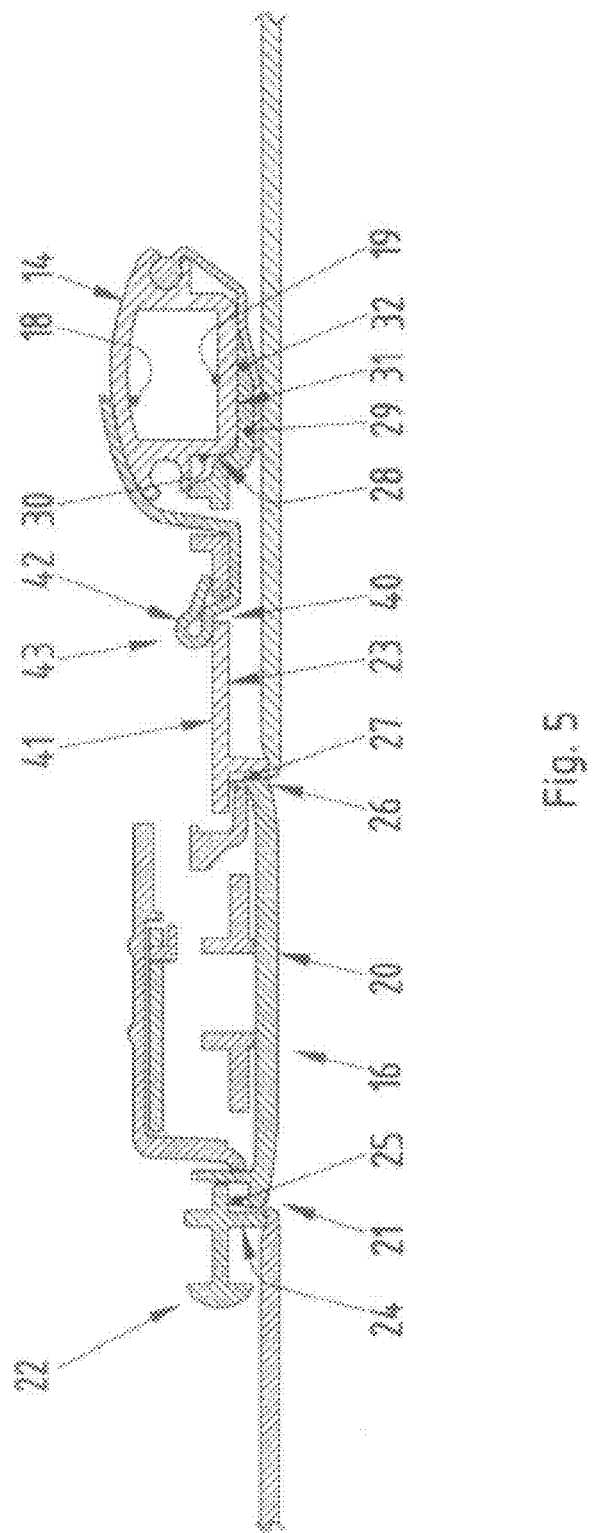
FIG. 5 illustrates an enlarged view of the cross-section of the folding top corresponding to detail Y of FIG. 4.

A first upright support section 28 and a second horizontal support section 29 of support arm 23 fit directly against an upright counterpart section 30 and a second horizontal counterpart section 31, respectively, of bottom side 19 of rear top bow 14. A relatively flat support section 32 of support arm 23 lies against bottom side 19 of rear top bow 14 (see FIG. 5).

On the side facing passenger compartment Fg, support section 32 of support arm 23 is connected with a fastening clip 33. Fastening clip 33 is made of a flexible material. Fastening clip 33 is connected at a connection point 34 to interior covering 13 using glue, stitches, etc. Connection point 34 is next to support section 32 of support arm 23. At an end of fastening clip 33 facing away from connection point 34, a thickened section 35 of fastening clip 33 in the form of a circular sealing strip is inserted into a corresponding recess 36 of upright wall 44 of rear top bow 14 so as to make a form-fit connection (see FIG. 4.).

Folding top 6 further includes a securing device 17. Securing device 17 fixes interior light 16 into position by tensioning interior light 16 against rear top bow 14. Securing device 17 is in the form of an elastic band with defined elastic properties (plastic, rubber, etc.). A rear end area 37 of securing device 17 comes into contact with support arm 23 of lens frame 22 and passes over top side 18 of rear top bow 14 in close contact with top side 18. Rear end area 37 of securing device 17 also passes through an opening 40 in a wall 41 of support arm 23 of lens frame 22 with a thickened section 43 of rear end area 37 in the form of a loop 42 being supported on wall 41. A front end area of securing device 17 is held in position against an element of front top bow 15.

As described above, first upright wall 44 of rear top bow 14 has a recess 36 incorporated therein for fastening clip 33. Fastening clip 33 is connected with interior covering 13 as described above. Similarly, second upright wall 45 of rear top bow 14 has a recess 46 for a second fastening clip 47. Second fastening clip 47 is connected with top cloth 12 at a connection point in a manner similar to how fastening clip 33 may be connected with interior covering 13.

When folding top 6 is in the closed position, rear top bow 14 and securing device 17 hold interior covering 13 and interior light 16 above passenger compartment Fg such that interior light 16 is positioned above the passenger compartment in order to illuminate the passenger compartment (this position is shown in FIG. 3). As folding top 6 is moved from the closed position to the opened position, top bows 14 and 15 move toward one another thereby releasing the tension provided by securing device 17 and eliminating the supporting effect of support arm 23. Interior light 16 with interior covering 13 and top bows 14 and 15 are folded together in a specific way to store folding top 6 in the opened position.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A folding top for a vehicle, the folding top comprising:
a cover having a convertible top cloth and an interior covering, the interior covering having an opening, wherein the top cloth and the interior covering are spaced apart from one another and each extend in a longitudinal direction;
a frame assembly having rear and front convertible top bows which are spaced apart from one another in the longitudinal direction, wherein the top bows extend in a direction transverse to the longitudinal direction through the spacing between the top cloth and the interior covering;
wherein the top cloth and the interior covering are stretched over the top bows with the opening of the interior covering being rearward of the rear top bow;
wherein the top bows are movable between a closed position in which the cover is raised and an opened position in which the cover is lowered;
a light positioned within the opening of the interior covering; and
a securing device extending along the longitudinal direction through the spacing between the top cloth and the interior covering between the front top bow and rearward of the rear top bow, wherein the securing device tensions the light against the rear top bow when the cover is raised.

2. The folding top of claim 1 wherein:
the light includes a lens and a lens frame, wherein the lens frame surrounds the edge of the lens, wherein the lens frame has a support arm that interacts on a side facing the rear top bow with the rear top bow.

3. The folding of claim 2 wherein:
the interior covering is fixed between facing edge sections of the lens and the lens frame.

4. The folding top of claim 3 wherein:
the rear top bow has a shaped profile with a bottom side and a top side;
wherein the support arm of the lens frame is brought up against the rear top bow between the top and bottom sides of the profile of the rear top bow.

5. The folding top of claim 4 wherein:
the bottom side of the profile of the rear top bow includes a first upright counterpart section and a second horizontal counterpart section;
wherein the support arm of the lens frame includes a first upright support section and a second horizontal support section, wherein the first and second support sections of the support arm of the lens frame fit directly against the first and second counterpart sections of the bottom side of the profile of the rear top bow, respectively.

6. The folding top of claim 4 wherein:
a relatively flat support section of the support arm of the lens frame lies against the bottom side of the profile of the rear top bow.

7. The folding top of claim 6 further comprising:
a first fastening clip;
wherein the support section of the support arm of the lens frame is connected with the first fastening clip adjacent to the interior covering.

8. The folding top of claim 7 wherein:
the first fastening clip and the interior covering are connected together at a first connection point next to the support arm.

9. The folding top of claim 8 wherein:
an end of the first fastening clip facing away from the first connection point has a thickened section which rests in a corresponding recess of the profile of the rear top bow.

10. The folding top of claim 2 wherein:
the securing device comes in contact with the support arm of the lens frame and passes over the top side of rear top bow and is fixed to an element of the frame assembly.

11. The folding top of claim 10 wherein:
the element is the front roof bow.

12. The folding top of claim 2 wherein:
the securing device passes through an opening in the support arm of the lens frame, and a thickened section thereof is supported on a wall of the support arm of the lens frame.

13. The folding top of claim 1 wherein:
the top cloth and the interior covering are of flexible materials.

14. The folding top of claim 1 wherein:
the securing device is an elastic band.

15. The folding top of claim 1 wherein:
the profile of the rear top bow is formed by a hollow body that has on upright opposite walls recesses that are separated when viewed in the longitudinal direction for holding fastening clips of the top cloth and the interior covering.

* * * * *